Figure 1:
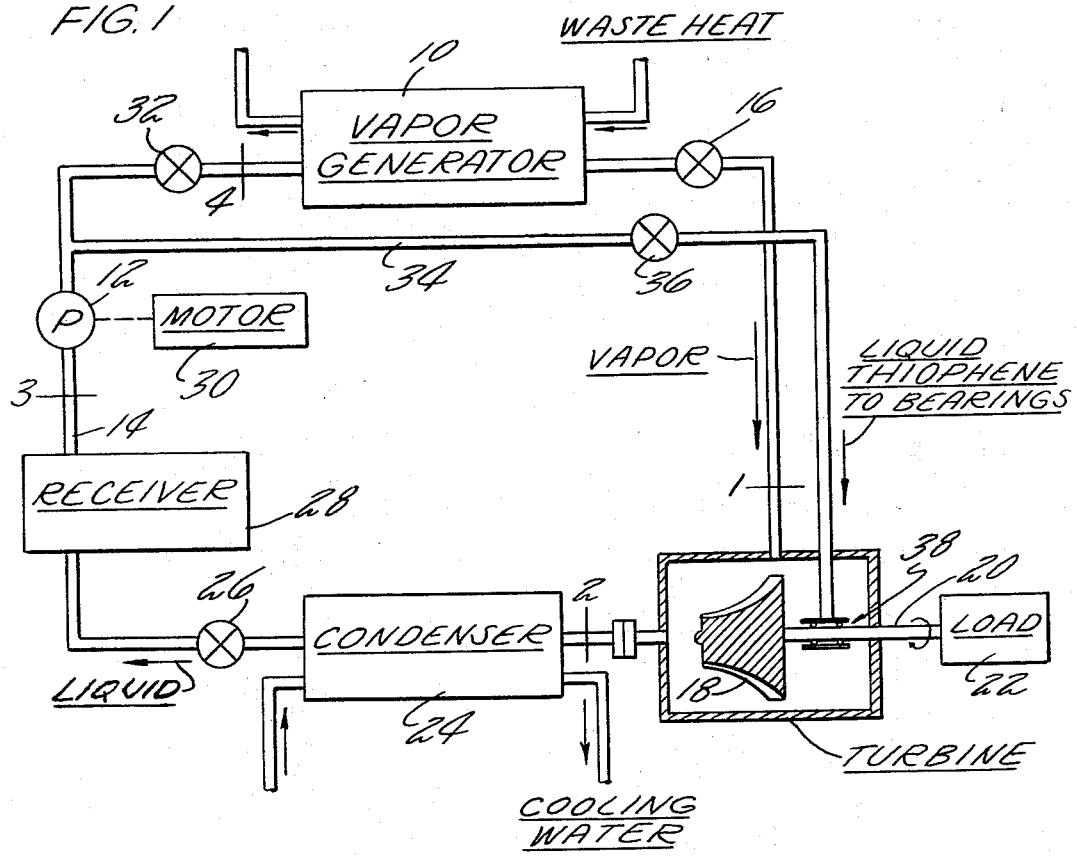

INVENTORS
NED C. RICE
FRANK R. BIANCARDI
ABRAHAM M. LANDERMAN
BY Donald J. Bradley
ATTORNEY 3,292,366
POWER GENERATING SYSTEM USING
THIOPHENE AS A WORKING FLUID
Ned C. Rice, Hartford, Frank R. Biancardi, Vernon, and Abraham M. Landerman, Storrs, Conn., assignors to United Aircraft Corporation, East Hartford, Conn., a corporation of Delaware
Filed July 16, 1965, Ser. No. 472,492
5 Claims. (Cl. 60—36)

This invention relates to a power generation system, and particularly to a Rankine-type power cycle. More specifically it has been found that a common organic chemical liquid compound, thiophene, whose chemical formula is $C_4H_4S$, can produce higher efficiencies and lower system costs than steam or any other known power cycle working fluid for applications where the maximum temperature of the heat source is limited to levels of 750° F. and below, and where power outputs of 5000 horsepower or less are desired. Thiophene can also provide the same efficiency and system cost advantages in a power loop even though the source temperature is above 750° F. if the operating temperature of the power fluid is limited to under 750° F.

The invention will be described in terms of a simple Rankine cycle power generation system in which thiophene is compared with other common working fluids, specifically steam and fluorocarbon refrigerants 11, 12, 113 and 114.

The principal advantage of thiophene for power generation lies in its ability to use compact, single-stage axial or radial-inflow turbines which can be less costly per shaft horsepower than multistage steam turbines and more efficient than high specific work single-stage steam turbines. This advantage arises primarily because of the large differences in the molecular weight and latent heat of vaporization near atmospheric pressure between steam on the one hand and thiophene on the other. Thiophene has a molecular weight of 84.13, almost 5 times greater than that of steam, and at one atmosphere its latent heat of vaporization of approximately 162 B.t.u./lb. is about one-sixth that of steam. The boiling points at one atmosphere are 182° F. for thiophene and 212° F. for steam. Thiophene also has a relatively high critical temperature of 584° F. which permits use of subcritical pressures at the turbine inlet and reduced pump work in pressurizing the fluid entering the vapor generator.

Thiophene power generation systems are particularly useful in waste heat recovery where low temperature waste heat from any source of the order of 250° F. to 750° F. may be utilized to produce power from a turbine or other power generator. As efforts are made to reduce product costs, improve operating efficiencies and reduce water consumption, the recovery and conversion to shaft power of waste heat from industrial process plants, chemical plants, oil refineries and prime movers such as gas turbines has become of great interest.

The source of heat for the system is not limited, and heat from the combustion of fossil fuel, or the exhaust of prime movers, or from any operation in which the heat would normally be rejected to the atmosphere may be used.

It is therefore an object of this invention to provide an improved power generation system.

Another object of this invention is an improved power generation system utilizing an organic chemical compound as its working fluid.

A further object of this invention is a power generation system utilizing a power cycle working fluid which produces higher efficiencies and permits lower system costs than other known working fluids where the heat source temperature is under 750° F. and the power output is 5000 horsepower or less.

Another object of this invention is a power generation system utilizing low temperature waste heat as the heat source.

A further object of this invention is a power generation system in which the working fluid is used to lubricate the turbomachinery bearings.

Another object of this invention is a power generation system in which thiophene is the working fluid.

Figure 2:
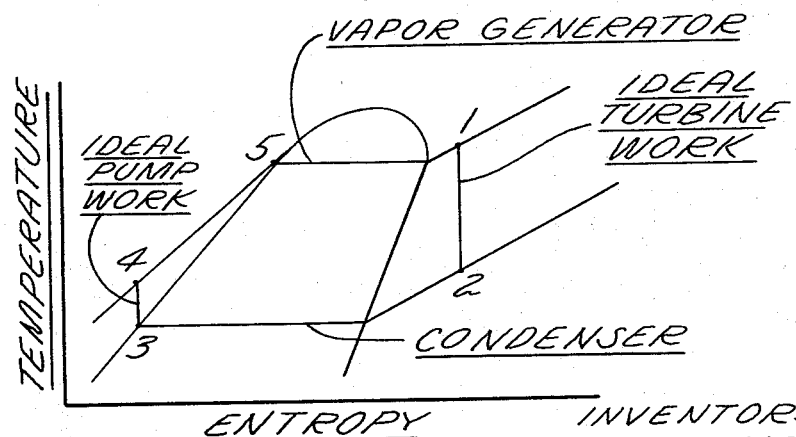
Figure 3:
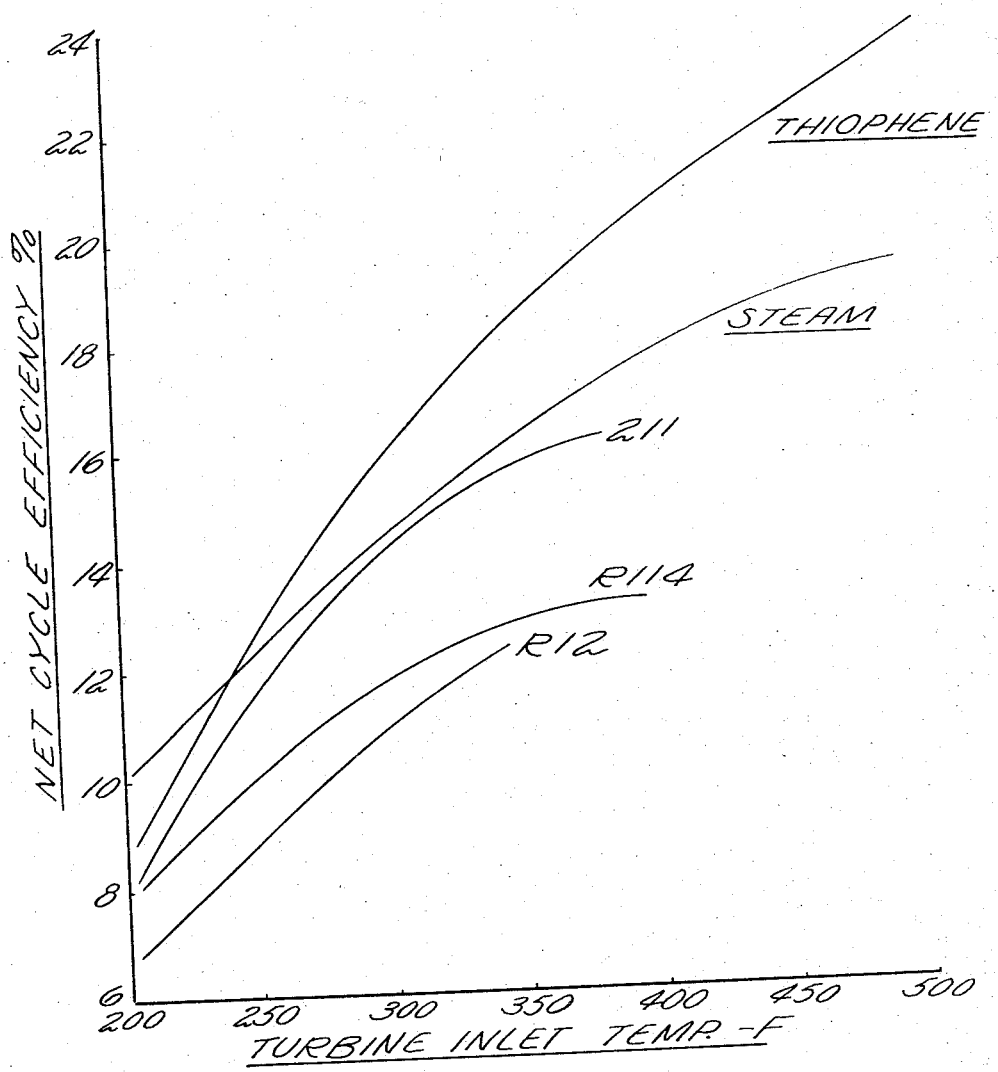

These and other objects of this invention may be more readily understood by referring to the following description and claims, read in conjunction with the accompanying drawings, in which:

FIGURE 1 shows in diagrammatic form a typical Rankine power generation system incorporating the teachings of this invention; and FIGURE 2 is a graph of temperature versus entropy for the power system of FIGURE 1; and FIGURE 3 shows graphically the performance cycle for selected working fluids.

Referring particularly to FIGURE 1, a vapor generator or boiler 10 heats the liquid thiophene fed to the boiler by liquid feed pump 12 through conduit 14. Vapor generator 10 also vaporizes the thiophene at essentially constant pressure. The vapor is then fed through a solenoid valve 16 to turbine 18 which expands the high temperature, high pressure vapor to produce mechanical shaft power through shaft 20 to a load 22. The thiophene, still in vapor form, is then fed to condenser 24 where it is liquefied by removing heat without substantial pressure drop and circulated through check valve 26 to receiver 28 from which the liquid thiophene is continued through the cycle. Pump 12 is driven by electric motor 30, and another check valve 32 may be included in the system to control the liquid flow.

Conduit 34 is connected in the system downstream of pump 12, and a small portion of the liquid thiophene may be fed from conduit 14 through conduit 34 to the turbine bearings indicated at 38 in order to lubricate the bearings. A valve 36 in conduit 34 controls the flow of thiophene to the bearings.

The cycle shown is a well-known Rankine cycle using thiophene for the working fluid instead of steam or other well known working fluids. The actual size and performance of the system components will vary with the application, output load, input heat, etc., and their design is obvious to those skilled in this art. The unique aspect of the cycle is the use of thiophene as the working fluid to produce novel and unexpected results.

As indicated previously, the heat input to vapor generator may be waste heat of 250° F. to 750° F. from any source, or any other heat source.

The practical advantages flowing from the use of thiophene as the working fluid rather than steam, fluorocarbons, or other fluids, in addition to the ability to use simpler, smaller and more efficient turbomachinery to obtain equal power outputs, reside first, in the reduction in the size of the condenser apparatus due to the high efficiency system performance; second, in the elimination of separate lubrication systems through the use of the liquid thiophene to lubricate the turbomachinery bearings; third, in the greater flexibility of the vapor generator design due to the extreme inert and thermally stable characteristics of the fluid at operating temperatures of 600° F. to 750° F.; fourth, in the fact that superheating is not required in the vapor generator to avoid moisture droplets and problems in the turbine exhaust; fifth, in the reduction of pressure extremes that would be experienced between the high and low temperature portions of the system; and, finally, in the fact that the fluid thiophene may be obtained at a price competitive with or lower than the price of most widely used fluorocarbons.

FIGURE 2 shows the temperature-entropy characteristics of the cycle described. The numbers refer to corresponding positions in FIGURE 1. It may be seen from the shape of the vapor dome on the temperature-entropy diagram that it is not necessary to superheat the vapor going into the turbine to thereby achieve a moisture free fluid from the exhaust.

For Rankine cycles where the boiling does not occur near the fluid critical point, the heat input to the fluid is approximately equal to the latent heat of vaporization at one atmosphere. Therefore in order to achieve reasonable thermal cycle efficiencies, the turbine work output per pound of fluid must be from 20% to 50% of the latent heat of vaporization of the fluid at one atmosphere. For steam the isentropic enthalpy drop is from 200 to 500 B.t.u./lb., for thiophene from 30 to 80 B.t.u./lb., and for the fluorocarbons from 10 to 40 B.t.u./lb. The drop for thiophene is in the range where single-stage turbomachinery of the axial impulse or radial inflow type will provide an isentropic efficiency of 70 to 80%. The high efficiency is produced in part because thiophene vapor, unlike steam, increases in superheat as it is expanded through the turbine, and as shown in FIGURE 2 thermodynamic losses and erosion problems due to liquid droplets in the exhaust can be avoided.

To achieve high cycle efficiencies with steam the ideal turbine enthalpy drop per pound must be from 5 to 10 times larger than for thiophene. Since several turbine stages are required, usually of the axial flow type, to achieve efficient expansion with steam, these machines will be more costly than a single stage thiophene machine of the same output. When single stage steam turbomachinery is used to lower machine costs, the expansion process is not efficient and the cycle efficiency is reduced accordingly.

A comparison of the net cycle efficiencies obtainable with steam, thiophene and selected common freon working fluids is shown in FIGURE 3 as a function of various turbine inlet temperatures for a system designed to produce 1000 shaft horsepower. The data assumes a turbine isentropic efficiency of 80% for the organic fluids and uses actual published data for steam efficiency. The data is for a 5% pressure loss in the condenser and vapor generator, using a simple Rankine cycle with no feedheating, saturated vapor conditions at the turbine inlet, and a condenser temperature of 120° F. Above a turbine inlet temperature of 280° F. the isentropic enthalpy drop for thiophene turbines is greater than 40 B.t.u./lb., and the efficiencies for such turbines is somewhat lower than 80%.

A disadvantage of fluorocarbons for use as working fluids is that they are relatively expensive and tend to decompose at elevated temperatures if lubricants, air or water are introduced in the system. Steam systems must be operated under high vacuum conditions in the condenser, and require a purification system to remove undesirable solids from forming in vital components. Also, low horsepower steam turbines tend to be inefficient and expensive. Thiophene systems require vacuum operating conditions only if the condenser operating temperature is below 184° F., and are about equivalent in cost to the fluorocarbons. Possible disadvantages of thiophene are that it must be kept chemically pure to prevent reactions with system materials of construction, and it has a relatively low flash point and auto ignition temperature.

It is therefore apparent that the cycle thermal efficiency for a power system using thiophene as a working fluid is comparable to that obtainable with steam systems, and for horsepower ratings of less than 5000 and for maximum waste heat source temperatures up to about 750° F. thiophene shows numerous advantages. This is primarily because of higher turbine efficiencies in comparison with steam turbines for lower horsepower systems.

While this invention has been described in its preferred embodiment, it is apparent that changes and modifications may be made by those skilled in the art without departing from the scope of the invention as hereinafter claimed.

We claim:

1. A method for operating a power generating system comprising the steps of
    vaporizing in a vapor generator a working fluid consisting entirely of thiophene
    isentropically expanding said vaporized thiophene through a turbomachine to produce work,
    removing heat from said vaporized thiophene in a condenser to liquify said vapor,
    and pumping said liquid thiophene into said vapor generator.

2. The method of operating a power generating system as in claim 1 and including the step of heating said thiophene in said vapor generator from a heat source of between approximately 250° F. and 750° F.

3. The method of operating a power generating system as in claim 1 and including the step of heating said thiophene in said vapor generator from a heat source which will limit the temperature of said thiophene to under about 750° F.

4. In a power generating system in which a working fluid is heated to a vapor state, expanded through a turbomachine to produce work, and cooled in a condenser to a liquid state, and method of improving the efficiency of said system which comprises
    inserting liquid thiophene as the working fluid in said system, and
    heating said liquid thiophene from a heat source of between 250° F. and 750° F.

5. In a power generating system as in claim 4 in which said turbomachine is a turbine having bearings, the further step of lubricating the bearings of the turbine with said liquid thiophene.

References Cited by the Examiner

UNITED STATES PATENTS

| | | | |
|---|---|---|---|
| 2,820,348 | 1/1958 | Sauter | 60—59 |
| 3,040,528 | 6/1962 | Tabor et al. | 60—36 |
| 3,234,734 | 2/1966 | Buss et al. | 60—36 |

EDGAR W. GEOGHEGAN, *Primary Examiner.*